April 17, 1945.  W. M. EMERY  2,373,667
IMPACT CLUTCH
Filed Feb. 11, 1943  2 Sheets-Sheet 1
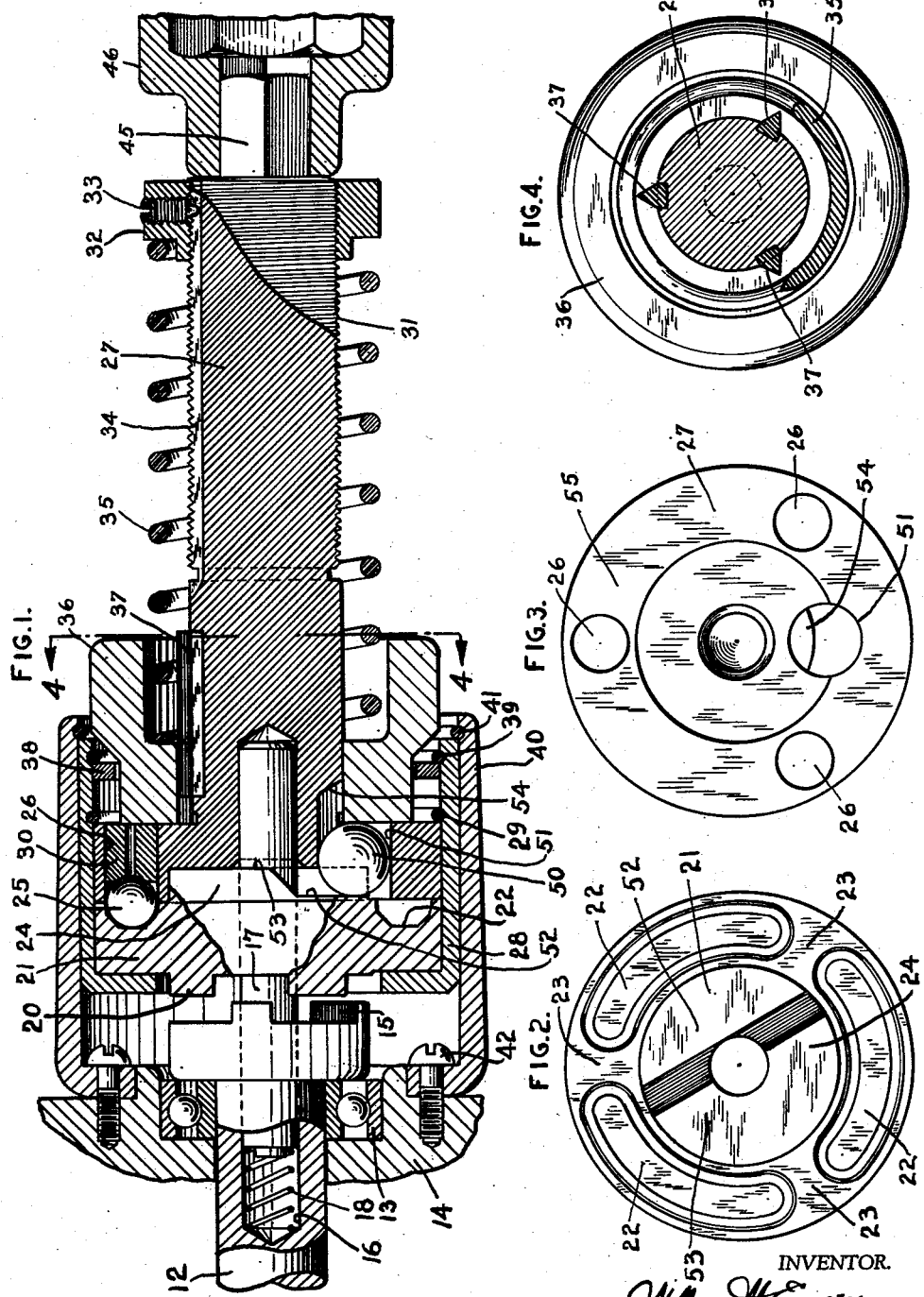
INVENTOR.
William M. Emery
BY April 17, 1945.    W. M. EMERY    2,373,667
IMPACT CLUTCH
Filed Feb. 11, 1943    2 Sheets-Sheet 2
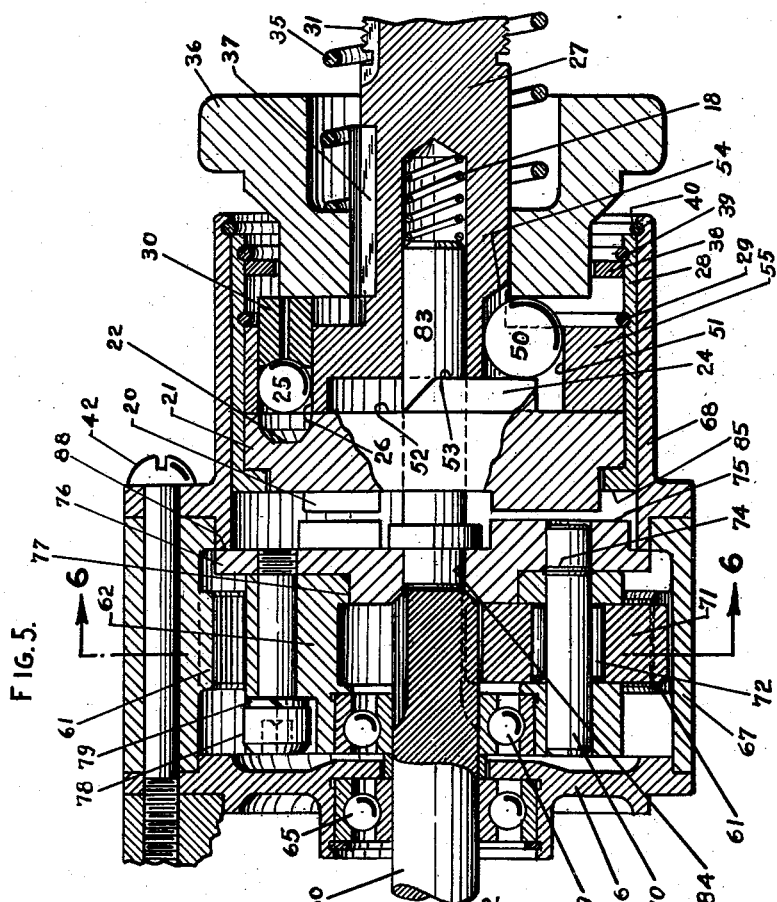
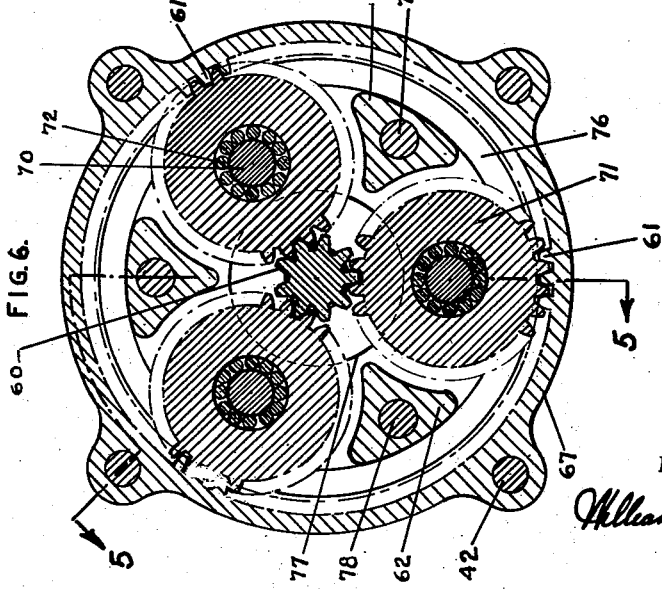
INVENTOR.
William M. Emery Patented Apr. 17, 1945

2,373,667

UNITED STATES PATENT OFFICE 2,373,667

IMPACT CLUTCH

William M. Emery, Shaker Heights, Ohio, assignor to The Rotor Tool Company, a corporation of Ohio Application February 11, 1943, Serial No. 475,516

2 Claims. (Cl. 192—30.5)

This invention relates to improvements in intermittent clutches suitable for nut setters, stud setters, power screw drivers, and the like, and wherever it is desirable to augment simple torque of a tool by the use of impact or forces incident to a sudden reduction of momentum. My invention is applicable to portable rotary tools powered electrically or pneumatically, similar to drills and also to non-portable spindle machines and to flexible shaft tools.

Furthermore, this invention also relates to improvements in the embodiment shown in my copending application #420,632, filed November 27, 1941. Many of the objects set forth in my copending application apply to this invention. There is also a similarity in many respects thereto both in operation, design and the use of inertia to resist the sudden disengagement of the clutch and to delay the re-engagement thereof.

My concept of an intermittent impact clutch is a form of mechanical gear whose function is to store the energy of the prime mover developed over an interval of time and to discharge it in an instant impact blow. In this definition the capacity to store energy is of equal and inseparable importance to the period of storing and the instantaneous discharge. If one stores the energy supplied during one revolution of a work spindle and applies it to effect a single instant impact blow it follows that the blow would be three times as great as if only the energy supplied during one-third of a revolution was so applied. It also follows from my conception of impact, that this would only be true if the frictional losses during the interval of accumulation of energy were reduced to a minimum. In the light of this concept the importance of my invention will be more readily understandable.

Objects of my invention are to provide means:

To deliver a greater impact blow without increasing the horsepower of the tool.

To assure a greater interval to accumulate energy between each impact blow.

To cause a constant interval of energy accumulation between each impact blow.

To assure only one impact blow per revolution of the driving parts of the clutch and to do this while maintaining a plurality of impact stations in a symmetrical, equally spaced arrangement, striking in unison at the instant of impact.

To set or stress nuts, screws, etc., tighter without overloading the motor.

To provide a clutch having means to substantially adjust the bolt tension or other products of impact forces without changing the number of impact blows effected per revolution.

To operate nut setters and produce impact blows while revolving the clutch parts at higher speeds thereby increasing the momentum of the clutch parts substantially by the square of their speed.

To operate such tools with less motor torque and effect greater blows while reducing the tendency to stall on resilient work.

To set nuts, screws, and the like at high speed to a surprising uniformity of tightness.

To reduce to a minimum the rotary frictional drag incident to the complete and partial re-engagement of the clutch during the period of energy accumulation between impact blows.

To reduce wear of timing cams to a minimum by reducing the friction thereon during the period when the intermittent clutch is not driving but accumulating energy between impact blows.

To cause wear of a clutch using engageable balls to tend to equalize the spacing of the stations of impact.

To better store forces accumulated during a prolonged period between impacts operatively located between the gears and the clutch.

To provide a sun and planetary geared drive between the motor and the clutch giving an increased reduction and strength to resist shock and providing mass means to store forces to be used at the instant of impact.

To provide an impact producing tool wherein the motor transmission, gear reduction and clutch all revolve bodily in the same direction and to provide that all parts revolve about a common axis.

To provide a simpler, shorter, stronger and more efficient mechanism to drive the impact clutch capable of greater force storing capacity.

To momentarily increase the friction of the movement of parts incident to the disengagement of the clutch at the instant of impact.

Other objects and novel features of my invention will be apparent from the following specifications and claims when considered together with the accompanying drawings in which:

Fig. 1 is substantially an axial cross section of an intermittent clutch embodying my invention.

Fig. 2 is an end view of one clutch member of the same embodiment.

Fig. 3 is an end view of the mating clutch member of the same embodiment.

Fig. 4 is view of the inertia follower member shown in the same embodiment as indicated by line 4—4 in Fig. 1.

Fig. 5 is a cross sectional view taken substantially on line 5—5 of Fig. 6 of a slightly modified embodiment with the parts in a different position and with a sun and planetary gear drive to provide beneficial force storing capacity for my clutch.

Fig. 6 is a view on line 6—6 of Fig. 5.

In Fig. 1 is shown a revolvable driver 12 mounted in ball bearings 13 in a frame 14. On the end of driver 12 is a half of a three-jaw dog clutch 15. Axial hole 16 journals a pilot pin 17 and houses a compression spring 18 which presses on the pilot pin 17 axially. Dog clutch 15 engages mating teeth or dogs 20 on the back half clutch 21. Cut into the other side of the clutch half 21 as shown in Fig. 2 is a race 22 triply interrupted at spaced intervals by abutments or interruptions 23, and a cam 24. The contour of the race is dealt with in the previously mentioned co-pending patent.

Operating in the race to strike the abutments are three steel balls 25 mounted for movement parallel to the axis of the clutch in three equally spaced holes or conduits 26 in the flanged end of the spindle or front half of the intermittent clutch 27. Thus a plurality of impact stations are provided in each revolution. The two clutch halves 21 and 27 are held snugly together longitudinally by the flanged sleeve 28 and retainer ring 29. Clutch halves 21 and 27 together with the balls 25 constitute an intermittent clutch when considered with their associated parts. Three followers 30 are inserted in holes or conduits 26 behind the balls 25. A work spindle or stem end of the clutch 27 is threaded at 31. A nut 32 having a dog point set screw 33 extending into slot 34 adjustably compresses spring 35 which presses against the inertia or mass follower 36 which is keyed to the spindle of the front half clutch 27 by three especially shaped keys 37. See Fig. 4. The inertia follower 36 normally is in the position shown in Fig. 1 ready to resist any movement of the balls 25 or ball followers 30.

To prevent the balls 25 and followers 30 from jumping out of holes 26 I have devised a thrust ring 38 held in the sleeve 28 by retainer ring 39. A hood 40 journals and pilots the sleeve 28 and retainer ring 41 limits its axial movement. Hood 40 is fastened to the frame 14 by screws 42.

On extreme end of the front half clutch 27 is a square driver 45 suitable to drive a nut socket 46 or other tools.

A ball 50 contacts cam 24 and operates in a hole or conduit 51 drilled in the front half clutch 27 and when cam 24 is in certain positions the ball 50 contacts the inertia follower 36 and prevents it from pressing against followers 30 and balls 25 to engage the clutch.

Certain phases of the operation of the clutch shown herein are explained more fully in my co-pending application previously mentioned.

The drive 12 can be revolved by a motor, drill, flexible shaft or any other suitable method but such drive must have suitable force storing capacity for maximum efficiency. I will hereafter show a specific drive which materially increases the unit efficiency. When axial pressure is applied toward the nut socket 46 the dog clutch parts 15 and 20 are engaged by the axial sliding of sleeve 28 in hood 40 and the compression of spring 18. Unless the revolving socket 46 is materially resisted then all parts shown except the hood 40 attached to frame 14 will revolve in unison such as when a nut is being run down freely on a bolt before it is set.

If the turning of the socket 46 is materially resisted and more especially if it is suddenly resisted the abutment angles which are quite acute, such as 12° to 16° will suddenly accelerate and thrust the three balls 25 against the inertia follower 36 which has mass in excess of its structural requirements. For structural purposes only the length of part 36 need be no more than one-tenth the length shown in Fig. 1. The inertia of a mass such as 36 offers considerable resistance to such sudden acceleration and accordingly at this instant of impact considerable torque and momentum forces are transmitted to the socket from the revolvable parts shown in Fig. 1 and from other revolving driving parts such as are shown in Fig. 5 when attached to the driver 12 because when the turning of socket 46 is suddenly resisted such parts are suddenly decelerated before the clutch can fully disengage when its engagement is resisted by the inertia of the mass 36. However, if the socket 46 is not suddenly resisted so that the revolving parts were not suddenly decelerated then forces of torque rather than impact or momentum operate to revolve the driver 12. Then the movement of the balls 25 and followers 30 would be slower and the force required to more slowly accelerate the inertia follower would be so slight that there would be little danger of stalling the mechanism driving the driver 12. This is a condition frequently occurring when tightening studs, pipe threads and when gaskets are used.

Accordingly, with my invention I can produce impact forces of great magnitude when the revolving of the clutch is suddenly resisted and without changing the clutch adjustment it will function without stalling when the revolving clutch is more gradually resisted. An improvement of great importance first set forth in my co-pending application allowing as it does higher speed operation and accordingly less reactive torque on the operator.

In actual operation, because the driver may be revolving at from 1000 to 1500 R. P. M., a plurality of impact blows are applied to fully set the nut or other work.

When the balls 25 are suddenly ejected from the race 22 and the inertia follower 36 is suddenly accelerated its movement is also resisted by spring 35. The more violent the acceleration and the heavier the inertia follower and the lighter and longer the spring, the longer interval of time will elapse before the inertia follower 36 will return to its normal position to bear against the followers 30 and balls 25 to press them into the race 22 to engage the front half and back half clutch members. While the inertia follower is away from its normal position, the intermittent clutch parts 21 and 27 may revolve relatively with a minimum of friction therebetween.

If spring 35 is stiff and the follower 36 light so that inertia would not materially affect the movement of the follower, as is the case in intermittent clutches of older and less efficient designs, then there would normally be three impact blows per revolution of the driver 12 or possibly an irregular number of blows per revolution so that the maximum impact output would be proportional to the amount of energy applied to the driver during substantially one-third of a revolution.

To secure impact blows suitable for a wide range of bolt sizes or work I adjust the tension of spring 35 and also use inertia followers 36 of various masses. See heavier follower in Fig. 5. With an inertia follower of small mass and with a spring such as 35 but more highly stressed, to secure increased range I can eliminate ball 50 and secure three impact raps per revolution which for light work may be desirable. But one of the objects and important improvements of this invention is to concentrate the energy applied in one or more revolutions of driver 12 into each impact blow thereby producing blows of great and surprising impact with a comparatively small horsepower applied to revolve the driver 12 thus providing a lighter and more portable tool.

One way I do this is by preventing the forces of spring 35 from being applied to engage the clutch except at one point in each relative revolution of the ball clutch members 21 and 27. Cam 24 is arranged so that ball 50 is in an obstructing position to prevent the three ball followers 30 except in one impact position per revolution of the clutch members 21 and 27 in each direction of revolution. When an impact blow occurs with the balls fully engaged and the inertia follower is started on its reciprocating cycle, the ball 50 passes from a position contacting with the low portion 52 of cam 24 to contact with the high portion 53. It cannot escape from hole 51 because of the shoulder 54. If the inertia follower 36 is returned by spring 35 before the low portion 52 of cam 24 is in contacting position then the inertia follower 36 is held away from the flanged end 55 of the front half clutch 27 until the cam has revolved to a point which returns the clutch parts to the original impact position. The ball 50 is loose enough to materially reduce friction at this time and the lightness of spring 35 compared to older clutches of equivalent capacity also reduces the friction.

In the past considerable difficulty has occurred with clutches using interrupted ball races because of the great manufacturing difficulty of equally spacing the holes 26 and the abutments 23. In such a case one or two balls or abutments carry most of the impact load and if the holes are unequally spaced the condition is never equalized by wear unless, as my present invention provides, the same holes, abutments and balls always contact at each impact. Thus my invention allows the clutch to "wear in" so that ultimately each abutment and ball carries its share of the impact blow. The cam 24 allows impact in only one clutch position in each revolution, thus increasing the uniformity of the work, the force of the impact and the durability of the parts.

With my improved clutch by the use of a heavy inertia follower 36 and a long light spring 35 more especially as shown in Fig. 5 and a driver speed of 1200 to 1800 R. P. M. I can secure more than a complete relative revolution of the clutch members 21 and 27 during the interval of time when the clutch disengages under impact throwing the inertia follower 36 violently away from flanged end 55 against spring 35 and before the inertia follower 36 returns to contact flanged end 55 or ball 50.

Thus the reciprocating movement of follower 36 consumes one relative turn of the clutch members 21 and 27 and the action of cam 24 prevents the reoccurrence of impact until the completion of the next revolution, so that the energy applied to the driver 12 during two revolutions is concentrated into each impact blow thereby increasing the magnitude of the blow obtainable from a motor of a given torque revolving the driver 12 if sufficient provision has been made to store such forces.

The inertia follower 36 being keyed to the front half clutch member 27 also has a flywheel effect so that if the revolving of clutch member 27 is suddenly resisted the momentum of the inertia follower 36 acting and pressing against the keys 37 will add materially to the impact blow. At this instant while the inertia follower 36 is pressing against the keys 37 it is necessary in order to release the clutch for the follower 36 to move longitudinally along the keys, so that until the rotary momentum of the inertia follower has been exhausted the longitudinal movement of the inertia follower 36 is further retarded by the friction on the keys 37 incident to said movement and the pressure incident to the rotary momentum of the inertia follower. It is obvious that any form of anti-friction keying would not produce this result which I obtain by using solid steel keys.

To increase this frictional action of the keys in my present invention instead of using keys with frictional sides normal to tangent forces, as I did in the previously mentioned patent application, I have changed their angle, moving the frictional sides out of a plane passing through them and the axis of the shaft to an angle of approximately 45° although I do not limit my invention to this or any other type of angle. Having an angle on both sides of the keys much the same effect is produced incident to the sequential raps when the clutch member 27 has ceased to revolve except under the sudden impact blows. In this case at each sequential blow the member 27 is momentarily suddenly accelerated for a fractional turn. The inertia of the follower 36 resists this acceleration and tends to effect a similar friction on the keys, which likewise resists the disengagement of the clutch.

The virtue of the key friction is that it is momentary and ceases completely after the forces of impact have been communicated to the work so that they will not tend to stall the driver 12. Thus, in certain respects, the effect of the forces of this friction are similar to the inertia forces incident to the axial movement of the inertia follower 36.

Thus, it will be seen that to provide an intermittent clutch of this character which will give maximum results when suddenly resisted and yet not stall when more gradually resisted it is necessary to employ a limited spring tension which may be overcome by the torque of the driver without recourse to the forces of momentum and to use other forces responsive only under conditions when the forces of momentum operate to resist the separation of the clutch until said forces of momentum have been materially reduced or exhausted by the application of these forces to the work in hand. In this I refer to the adjustable tension of spring 35, the mass of inertia follower 36 insofar as the mass resists axial acceleration and the friction between the keys 37 and the inertia follower 36 incident to the rotary effect of the inertia of its mass. My clutch is also operable without keys which are removable, if I desire to further reduce the force of the impact blows. This is a novel feature.

Accordingly, I offer means to vary the number of raps per minute by varying the tension of spring 35 and the mass of the inertia follower 36 and using or omitting the ball 50 and keys 37, thereby changing the speed of operation and the violence of the impact blow and the energy required to drive the driver to adjust my clutch to the requirements of a wide range of work.

Having described the action of my invention relative to the clutch improvement per se it will be apparent that if energy applied to a tool over a prolonged period such as one or more revolutions of the work spindle is to be stored for sudden discharge at the instant of impact, then means of storing said energy is of vital importance and such energy that cannot be stored is wasted and no impact power is gained by prolonging the energy storing period beyond the capacity to store said energy.

This is especially true and vital where the pinion shaft 60 in Fig. 5 or the driver 12, Fig. 1, is driven by a substantially constant speed induction motor which customarily operates on 180 cycle 3 phase current. The speed of such a motor is 10,500 R. P. M. This, I reduce with the gearing shown in Fig. 5 to 1350 R. P. M. The motor will not speed up at no load to more than 10,500 R. P. M. and if the average speed drops more than 8% or so the motor is overloaded and the inrush of current exceeds its safe capacity. When I say "average" I means that at the time of instant impact the speed of the motor might drop very low for the instant but that speed would quickly pick up to maintain a reasonable average speed.

Accordingly a sufficient revolving mass must be provided to secure such an energy storing capacity over a limited speed variation and in my embodiment shown in Fig. 5 I incorporated such a mass in a sun and planetary gear reduction. The weak point in a power transmission in any tool designed for minimum weight and size is in the pinion. Also the closer the revolving mass is operatively associated with the clutch, the less chance there is for loss of impact force due to the resiliency of the transmitting parts. Also with a stationary ring gear such as 61 and a revolving planetary gear spider 62 it is possible to secure more mass revolving in the same direction and more speed reduction with the same gear teeth and diameters. Also where the mass is close to the clutch the impact blow is struck with less speed variation of motor pinion shaft 60 which is very desirable.

With this in mind I will describe the drive shown in Figs. 5 and 6 which consists of a motor pinion shaft 60 journaled on one end by bearing 65 mounted in the end plate or frame 66. A similar bearing is assumed on the other end of the motor shaft 60 which is not shown. The ring gear 61 is cast integrally with a housing 67. Either separable or integral with the housing 67 is a clutch hood 68 which is rather similar in function to hood 40, Fig. 1.

The substantial mass of spider 62 is piloted on one end bearing 69 on shaft 60. Three equally spaced gear axle pins 70 are pressed in suitable holes in the spider 62 and three intermediate gears 71 are bearinged thereon with needle bearings 72. The three intermediate gears 71 mesh with the pinion 60 and with the ring gear 61. The spider 62 revolves in the same direction as the pinion 60 so that all the revolving parts of the tool revolve either rotationally or bodily in the same direction about a common axis.

Three dog clutch teeth 75 may be cut integrally in spider 62 but I show them on a separable plate 76 for replacement purposes. The gear axles 70 pass through the dog teeth 75 acting as direct driving pins. A double tapered shoulder 74 on the axle pins 70 is held between the spider 62 and plate 76 to prevent longitudinal movement of the pins 70 which as previously mentioned have a press fit in the spider 62. The plate 76 is also piloted in the spider at 77 and is clamped to the spider by screws 78, tapped in the plate 76 and locked with lock washers 79. A long pilot pin 84 functionally similar to 17 is brazed or otherwise securely fastened to plate 76 to make it integral therewith.

The remaining parts of the clutch are similarly numbered to those shown in Fig. 1 and are identical except that at 85 the flange of sleeve 28 is relocated to avoid interference with the dog teeth 75 and the spring 18 is relocated but its function remains unchanged in its capacity to tend to disengage the dog teeth 75 at 20. It also tends to press the spider 62 toward the pinion shaft 60. The longitudinal movement of the spider is further limited by the hood 68 and the plate 76 at 88.

Fig. 5 shows the embodiment as if the dog teeth 20 and 75 were disengaged at a time when cam surface 53 was revolved to keep ball 50 in a position to prevent the inertia follower 36 from pressing against ball followers 30 to engage the abutments 23. Also it will be noted that the mass of the inertia follower 36 is increased in Fig. 5 and the wire size of spring 35 has been reduced. This change as previously pointed out will tend to prolong the cycle of reciprocal motion of the inertia follower 36.

In operation, if the pinion shaft 60 turns right hand, the intermediate gears 71 will turn in the opposite direction on their axles 70 but bodily right hand the same as the pinion because the ring gear 61 is stationary. The spider 62 turns bodily right hand. The spider 62 and the intermediate gears 71 and the dog clutch half with teeth 75 possesses a considerable mass capable of storing potential energy in considerable volume between the pinion shaft 60 and the intermittent clutch. Also the intermediate gears 71, the spider 62, the dog clutch and the intermediate clutch form a unit assembly supported on one end by the pinion shaft 60 and on the other end by the hood 58, without intermediate supporting bearings.

From the foregoing explanation it is evident that I have materially improved intermittent impact clutches by providing for heavier impact blows without increasing the horsepower of the drive, by storing forces applied over a prolonged period for instant impact dissipation and I have provided a clutch and drive mechanism better suited for use with my clutch and with the induction motors commonly used in industry. Also, I have provided for increased efficiency and at the same time a wide adjustably variable range of impact intensities and means to vary by substitution and adjustment the number of impacts per revolution so that for example a customer having purchased a quantity of such tools for specific war work can readjust and rearrange the same tools for very different civilian work.

Also I have materially shortened and simplified the gear and clutch assembly by omitting customary bearings there between and making the dog clutch practically integral with the spider 62. Thus I have made the gear and clutch into a unit assembly bearinged only between ball bearing 69 and the sleeve 28 journaled in hood 68, with its intermediate parts further aligned by a pilot pin 83.

I do not limit my invention to the embodiments shown or to the proportions or data or speeds used in explaining it.

I claim:

1. In a rotational impact producing clutch the combination of first and second closely adjacent clutch members in fixedly spaced relationship and mounted for relative rotation, said first member having a ball race, a plurality of equally spaced interruptions therein, and a cam, the said second member having a like plurality of similarly and equally spaced conduits substantially parallel to the rotational axis of the clutch, a ball and a ball follower mounted for movement in each conduit means and ball means mounted therein for movement parallel to said axis when contacting with the cam on the first member and when the first member rotates relative to the second member, a movable thrust washer and a spring to normally resiliently position the ball followers in each conduit to effect engagement between the balls and the interruptions in the ball race during one portion of each relative rotation of the members, the cam being shaped to move the ball means into a position to block the thrust washer from effecting said engagement during the remainder of each relative rotation of the clutch members.

2. In a rotational impact producing clutch the combination of first and second closely adjacent clutch members mounted for relative rotation and in fixedly spaced relationship one to the other, said first member having a ball race, a plurality of equally spaced and steeply cammed interruptions therein and a supplemental cam, said second member having a stem parallel to the axis of rotation of the clutch and a flange thereon, a like plurality of similarly and equally spaced conduits passing through said flange substantially parallel to the rotational axis of the clutch, intermediate members mounted for movement in each conduit, supplemental conduit means through said flange and a cam follower mounted therein for movement parallel to said axis when contacting with supplemental cam in the first member and when the first member rotates relative to the second member, a thrust washer having mass in excess of its structural requirements to constitute a mass member mounted for axial movement on the stem toward and away from the flange, a spring mounted about the stem to normally resiliently press the mass member toward the flange, the intermediate members and the supplemental cam follower to position the intermediate members to effect resilient engagement with the steeply cammed interruptions in the ball race during one portion of each relative rotation of the members, the supplemental cam follower being shaped to move the cam follower into a position to block the mass member from effecting said engagement during the remainder of each relative rotation of the clutch members, the race interruptions being sufficiently steeply cammed to effect sudden and violent axial acceleration of the intermediate members and the mass member at the instant of impact between the intermediate members and the interruptions due to the said relative rotation of the clutch members and the mass of the mass member being sufficient to materially resist said sudden acceleration thereby materially resisting and retarding the disengagement of the clutch members.

WILLIAM M. EMERY.